(12) United States Patent
Murray

(10) Patent No.: US 11,215,295 B2
(45) Date of Patent: Jan. 4, 2022

(54) CONTROLLER ASSEMBLY

(71) Applicant: ROLLS-ROYCE plc, London (GB)

(72) Inventor: Christopher A. Murray, Nottingham (GB)

(73) Assignee: Rolls-Royce PLC, London (GB)

( * ) Notice: Subject to any disclaimer, the term of this patent is extended or adjusted under 35 U.S.C. 154(b) by 185 days.

(21) Appl. No.: 16/580,046

(22) Filed: Sep. 24, 2019

(65) Prior Publication Data

US 2020/0109796 A1    Apr. 9, 2020

(30) Foreign Application Priority Data

Oct. 8, 2018 (GB) .................................... 1816364

(51) Int. Cl.
*F16K 49/00*    (2006.01)
*F02M 53/08*    (2006.01)
*F16K 31/04*    (2006.01)

(52) U.S. Cl.
CPC ........... *F16K 49/005* (2013.01); *F02M 53/08* (2013.01); *F16K 31/046* (2013.01)

(58) Field of Classification Search
CPC .... F02C 6/08; F02C 9/18; F02K 1/822; F02K 7/06; F02K 7/067; F02K 9/40; F02K 9/566; F02K 9/58; F02K 9/64; F02K 9/927; F02M 53/043; F02M 53/08; F16K 31/046; F16K 49/005
USPC ................ 137/219, 221, 222, 614.13, 627.5; 251/129.21, 129.22
See application file for complete search history.

(56) References Cited

U.S. PATENT DOCUMENTS

| | | | |
|---|---|---|---|
| 2,679,856 A * | 6/1954 | Gerritsen | F16K 31/38 137/221 |
| 3,087,511 A | 4/1963 | Abild | |
| 3,092,132 A * | 6/1963 | Guy | F16K 1/12 137/219 |
| 3,204,969 A | 9/1965 | Williams | |
| 3,235,270 A | 2/1966 | Williams et al. | |
| 3,297,047 A * | 1/1967 | Sime | F16K 15/186 137/220 |

(Continued)

FOREIGN PATENT DOCUMENTS

CN    201277378    7/2009
DE    1775332    5/1971

(Continued)

OTHER PUBLICATIONS

European search report dated Feb. 25, 2020, issued in EP patent application No. 19196630.

(Continued)

*Primary Examiner* — Kevin F Murphy
*Assistant Examiner* — Jonathan J Waddy
(74) *Attorney, Agent, or Firm* — Shumaker & Sieffert, P.A.

(57) ABSTRACT

A controller assembly comprises an electromechanical actuator and a single-stage pneumatic flow switch configured to thermally protect the electromechanical actuator by a supply of cooling fluid. The single-stage pneumatic flow switch is movable between a first mode in which the switch is configured to open a cooling fluid flow passage and a second mode in which the switch is configured to close the cooling fluid flow passage. The electromechanical actuator is coupled to a valve movable between an open and a closed configuration.

12 Claims, 4 Drawing Sheets

(56) References Cited

U.S. PATENT DOCUMENTS

| | | | | |
|---|---|---|---|---|
| 3,380,469 | A | * | 4/1968 | Salerno .................. B64D 13/02 |
| | | | | 137/219 |
| 3,432,139 | A | | 3/1969 | Jentoft |
| 3,540,462 | A | * | 11/1970 | Renzi ...................... E04C 3/005 |
| | | | | 137/219 |
| 3,750,693 | A | * | 8/1973 | Hardison ............ F16K 31/0655 |
| | | | | 137/219 |
| 3,792,716 | A | * | 2/1974 | Sime ........................ F16K 1/126 |
| | | | | 137/492 |
| 3,825,026 | A | * | 7/1974 | Salerno ................ F01D 17/145 |
| | | | | 137/219 |
| 4,057,360 | A | | 11/1977 | Theis, Jr. et al. |
| 6,116,570 | A | | 9/2000 | Bulgatz et al. |
| 6,167,869 | B1 | * | 1/2001 | Martin ................. F02M 57/023 |
| | | | | 123/458 |
| 7,159,839 | B2 | | 1/2007 | Tanikawa et al. |
| 8,656,941 | B1 | * | 2/2014 | Hayward ................ F16K 1/126 |
| | | | | 137/221 |
| 2004/0129310 | A1 | | 7/2004 | Delobel et al. |
| 2006/0064982 | A1 | | 3/2006 | Mitten |
| 2009/0179087 | A1 | * | 7/2009 | Martin .................. F01N 3/2066 |
| | | | | 239/533.12 |
| 2010/0326089 | A1 | * | 12/2010 | Weber ....................... F02C 6/08 |
| | | | | 60/783 |
| 2012/0286178 | A1 | | 11/2012 | Kanzaka |
| 2016/0237915 | A1 | * | 8/2016 | Villanueva .............. F16K 1/126 |
| 2017/0335775 | A1 | * | 11/2017 | Ribarov ................... F02C 6/08 |
| 2017/0356348 | A1 | | 12/2017 | Ribarov et al. |
| 2018/0216539 | A1 | | 8/2018 | Widener et al. |
| 2019/0309647 | A1 | * | 10/2019 | Caratge .................. F01D 17/26 |

FOREIGN PATENT DOCUMENTS

| | | |
|---|---|---|
| DE | 3938905 | 5/1991 |
| EP | 3246606 | 11/2017 |
| FR | 67665 | 4/1973 |
| GB | 636115 | 4/1950 |
| GB | 1312182 | 3/1958 |
| GB | 1125102 | 3/1965 |
| KR | 20070030612 | 3/2007 |
| KR | 101507461 | 4/2015 |
| WO | 2013101795 | 7/2013 |

OTHER PUBLICATIONS

European search report dated Feb. 18, 2020, issued in EP patent application No. 19196631.

Great Britain search report dated Mar. 13, 2019, issued in GB patent application No. 1816364.2.

Great Britain search report dated Mar. 26, 2019, issued in GB patent application No. 1816365.9.

Response to Extended European Search Report from counterpart EP Application No. 19196630.8 dated Mar. 3, 2020, filed Oct. 8, 2020, 57 pgs.

* cited by examiner

CONTROLLER ASSEMBLY

CROSS-REFERENCE TO RELATED APPLICATIONS

This specification is based upon and claims the benefit of priority from United Kingdom patent application number GB 1816364.2 filed on Oct. 8, 2018, the entire contents of which are incorporated herein by reference.

BACKGROUND

Technical Field

The present disclosure relates to a controller assembly, and particularly, although not exclusively, to a controller assembly for use in a gas turbine engine, for example a gas turbine aircraft engine.

Description of the Prior Art

Some controllers, e.g. that control whether a system is in a first state (e.g. ON) or a second state (e.g. OFF) or that control the position of another component, may need to withstand and function in high temperature and pressure environments. For example, controllers for use in gas turbine aircraft engines will need to be able to function in this environment.

United Kingdom patent application GB 1125102 A discloses a solenoid actuator and a solenoid actuated fluid control valve. The solenoid actuator has a magnetic circuit including a magnetic element connected therein by two non-magnetic gaps. The magnetic element is mounted in relation to the remainder of the magnetic circuit in order to be capable of movement along a path at least one end of which is determined by a stop position, and is maintained in the stop position, when not actuated, by a biasing force. The solenoid actuator also has means, responsive to electric current, for producing in the magnetic circuit a magnetic flux whose magnitude is related to the current. Parts of the magnetic element and parts of the remainder of the magnetic circuit adjacent the respective gaps are proportioned and arranged so that the magnetic element moves in use from the stop position, the reluctance of one gap changes by at most a relatively small amount, while that of the other gap changes in reverse sense by a relatively large amount, the element being displaced against the biasing force through a distance which is continuously dependent on the magnitude of the current.

SUMMARY

According to a first aspect there is provided a controller assembly comprising an electromechanical actuator and a single-stage pneumatic flow switch. The switch is configured to thermally protect the electromechanical actuator by a supply of cooling fluid.

The controller assembly disclosed herein is able to support the continual flow of hotter air (e.g. bleed air) than its thermal capability if it was uncooled. For example, the controller assembly may be disposed in a flow passage for hot air (e.g. hot bleed air), but when the switch is configured to thermally protect the actuator, the actuator is surrounded by a cooling jacket of the cooling air. This allows the actuator to operate beyond its thermal design point as it is thermally shielded by the cooling jacket from the hot air. In one example, the switch is configured to thermally protect the controller assembly by a supply of cooling fluid.

The single-stage pneumatic flow switch is movable between a first mode in which the switch is configured to open a cooling fluid flow passage and a second mode in which the switch is configured to close the cooling fluid flow passage. The cooling fluid flow passage may be connected to a supply of cooling fluid. Therefore the switch is able to switch to a cooling flow that washes over the actuator when it is energised or de-energised (depending on the configuration), and thereby provide a cooling jacket around thermally sensitive components of the actuator.

The electromechanical actuator is coupled to a valve movable between an open and a closed configuration. The electromechanical actuator may be disposed in a fluid flow outlet of the valve. As hot air may flow through the valve, the actuator may therefore be disposed in a flow of hot air when the valve is open. The actuator may comprise a solenoid which may be connected to the valve to actuate the valve (e.g. via electrical wiring). Any type of solenoid may be used, for example, an oil, gas, hydraulic or pneumatic solenoid.

When in the first mode, the single-stage pneumatic flow switch may be configured to open a further fluid flow passage and, when in the second mode, the switch may be configured to close the further fluid flow passage. In one example, the further fluid flow passage may be connected to a control chamber of the valve. In this example the further flow passage may be to provide pressure to the valve control chamber and therefore may be connected to a source of pressure (e.g. pressurised fluid).

In the first mode, the single-stage pneumatic flow switch may be configured to cause the valve to open and, when in the second mode, the switch may be configured to cause the valve to close.

In the second mode the single-stage pneumatic flow switch may be configured to open a vent flow passage so that the control chamber of the valve is in fluid communication with the vent flow passage to thereby vent the contents of the control chamber (e.g. pressurised fluid contained therein).

Therefore, the switch may be configured to supply pressure to the valve control chamber to open the valve, or to vent the control chamber to close the valve. In the first mode the switch may be configured to open the further flow passage to supply pressure to the control chamber which will open the valve. In the second mode, the switch may be configured to close the valve by opening the vent flow passage to vent the control chamber which will close the valve. In this way, the switch is configured to open the cooling flow passage when the valve is open, and close the cooling flow passage when the valve is closed.

The electromechanical actuator may be configured to cause the switch to transition between its first and second modes, thereby configured to cause the valve to transition between an open and closed configuration. The electromechanical actuator may therefore be configured to open/close the valve and open/close the cooling flow passage etc.

Disclosed herein is therefore a controller assembly in which a switch assembly is coupled to a two-state valve. The switch comprises a primary and secondary flow switch, the primary flow switch being a 2-state 3-way switch (to selectively open or close a control chamber flow passage and a vent flow passage) and a 2-state 2-way switch (to selectively open or close a cooling fluid flow passage). The primary and secondary switches are disposed in tandem, in that movement of one causes movement of the other, e.g. they move concurrently. For example, the primary and secondary switches are connected to one another. Therefore, when the primary and secondary flow switches are open, hot air may be flowing over the controller assembly and actuator, but the actuator is thermally isolated by the cooling air jacket which is flowing through the cooling flow passage.

The further flow passage may be connected to a source of fluid at a higher pressure than the pressure across the valve to thereby pressurise the control chamber of the valve. The further flow passage may be connected to a source of fluid from an upstream side of the valve.

According to a second aspect there is provided a gas turbine engine for an aircraft, the gas turbine engine comprising an engine core comprising a turbine, a compressor, and a core shaft connecting the turbine to the compressor, a fan located upstream of the engine core, the fan comprising a plurality of fan blades, and a controller assembly as described above.

The controller assembly may be disposed within a valve body, and at least one spoke may connect the valve body to the electromechanical actuator.

The at least one spoke may comprise a radial spoke or an axial spoke (e.g. with respect to an axis of the valve, e.g. a longitudinal valve axis, e.g. an axis aligned with a flow direction through the valve).

The cooling fluid flow passage may be at least partially located within one spoke.

The controller assembly may be disposed within a valve body, which may comprise a valve having a control chamber. At least one spoke may connect the valve body to the electromechanical actuator. A pressure source may be connected to the valve control chamber, which may be at least partially located within one spoke.

The controller assembly may be connected to the gas turbine engine such that bleed air is configured to flow through the valve assembly and around the actuator. For example, the controller assembly may be connected to the compressor and/or the turbine of the gas turbine engine such that bleed air is configured to flow through the valve assembly and around the actuator.

Therefore, in one example, one fluid flow passage may be at least partially disposed within a spoke connecting the valve body to the actuator. For example, one spoke may carry fluid, e.g. pressurised fluid, to the valve control chamber. One spoke may carry cooling fluid to the actuator. One spoke may carry a wire, e.g. an electrical conductor, from the actuator to the valve so that the actuator is configured to control the valve (e.g. configured to open/close the valve).

In one example, the controller assembly and/or actuator may be disposed in the valve flow passage concentrically to the valve body, e.g. in an outlet of the valve in the valve efflux flow. In one example, the controller assembly and/or actuator may be disposed in the valve flow passage non-concentrically to the valve body, e.g. in an outlet of the valve in the valve efflux flow. In either example, the control chamber and/or the cooling flow passage may be outside, e.g. not within, any one of the spokes.

In one example, the controller assembly and/or actuator may be disposed outside the valve flow passage, e.g. outside of the valve efflux flow.

In one example, the cooling flow, after washing over the actuator, and the valve main flow may exhaust into the same sink pressure. In a further example, the cooling flow, after washing over the actuator, may directed (e.g. be piped) to a separate sink pressure which may be at a different pressure level. For example, the assembly may comprise a first sink pressure and a second sink pressure and, in one example, the cooling flow after flowing around the actuator may be directed to the first sink pressure and the valve efflux flow may be directed to the second sink pressure. In another example they may be both directed to the same sink pressure.

The cooling fluid flow passage may be connected to a source of cooling fluid. The control chamber flow passage may be connected to a source of pressure (e.g. "muscle air" or "servo pressure").

In this way, for some examples, the control assembly only provides cooling flow when the valve is open and the actuator is thereby in the presence of high temperature efflux air from the valve. When the valve is closed, hot air does not pass by the actuator and cooling flow does not pass around the actuator (as it is not necessary to cool the actuator when the actuator is not exposed to hot air). In this way, a specific fuel consumption penalty is only incurred when it is necessary to cool the controller, and wasteful parasitic cooling flows may therefore be avoided.

The controller assembly may therefore enable the actuator within the assembly to be thermally protected when hot air passes through the assembly, allowing the actuator to continue to function to specification when the surrounding air is hotter than the thermal capability of the actuator.

This configuration may also minimise parasitic cooling flow as cooling flow may be employed only when it is needed, and may also eliminate the need to use controller banks (which can be costly and inconvenient to replace) as the control assembly may be located within, or integral to, the valve itself. Furthermore, as the control assembly may be integral to the valve, a flow amplifier may not be needed with no compromise in response time. This, in turn, allows for cost, component complexity and weight to be reduced.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
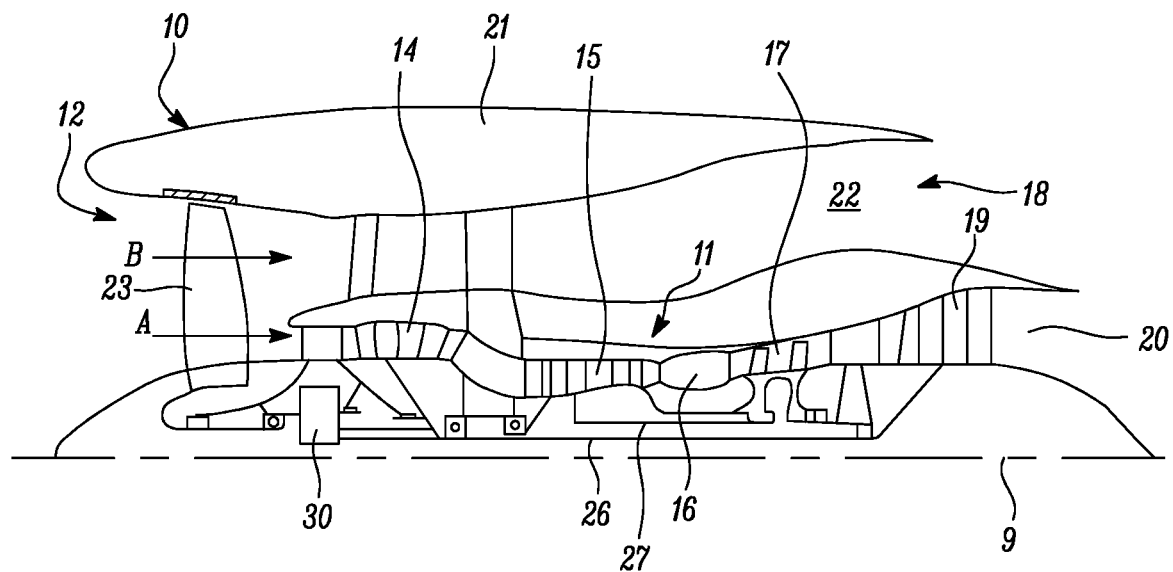
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
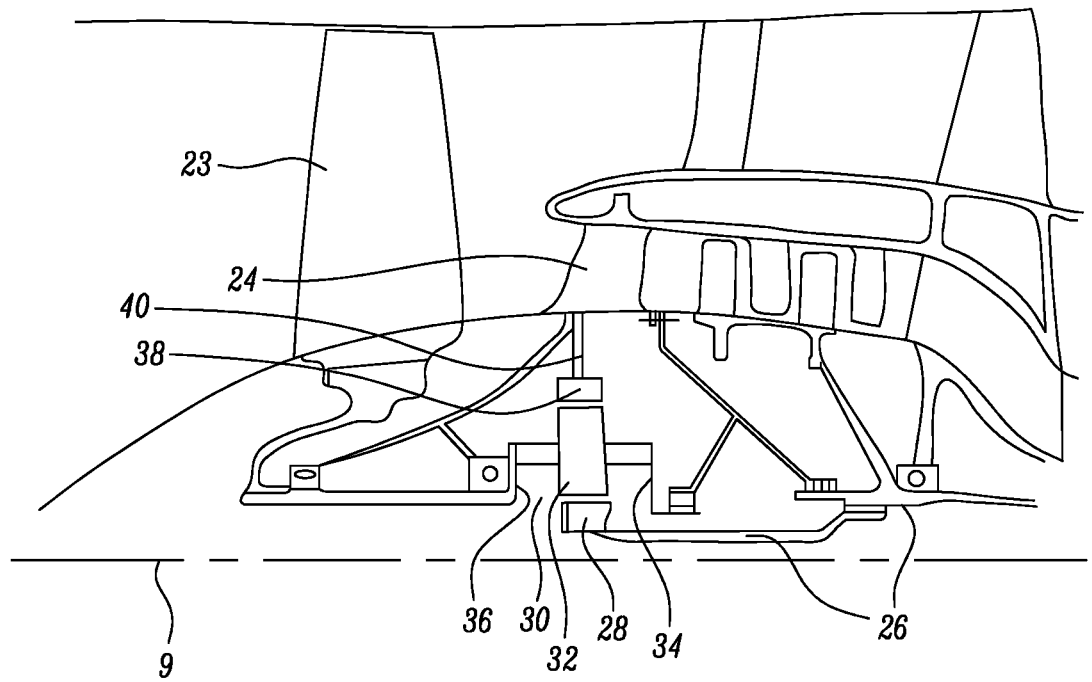
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

It will be appreciated that the arrangement shown in FIG. 2 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 3A:
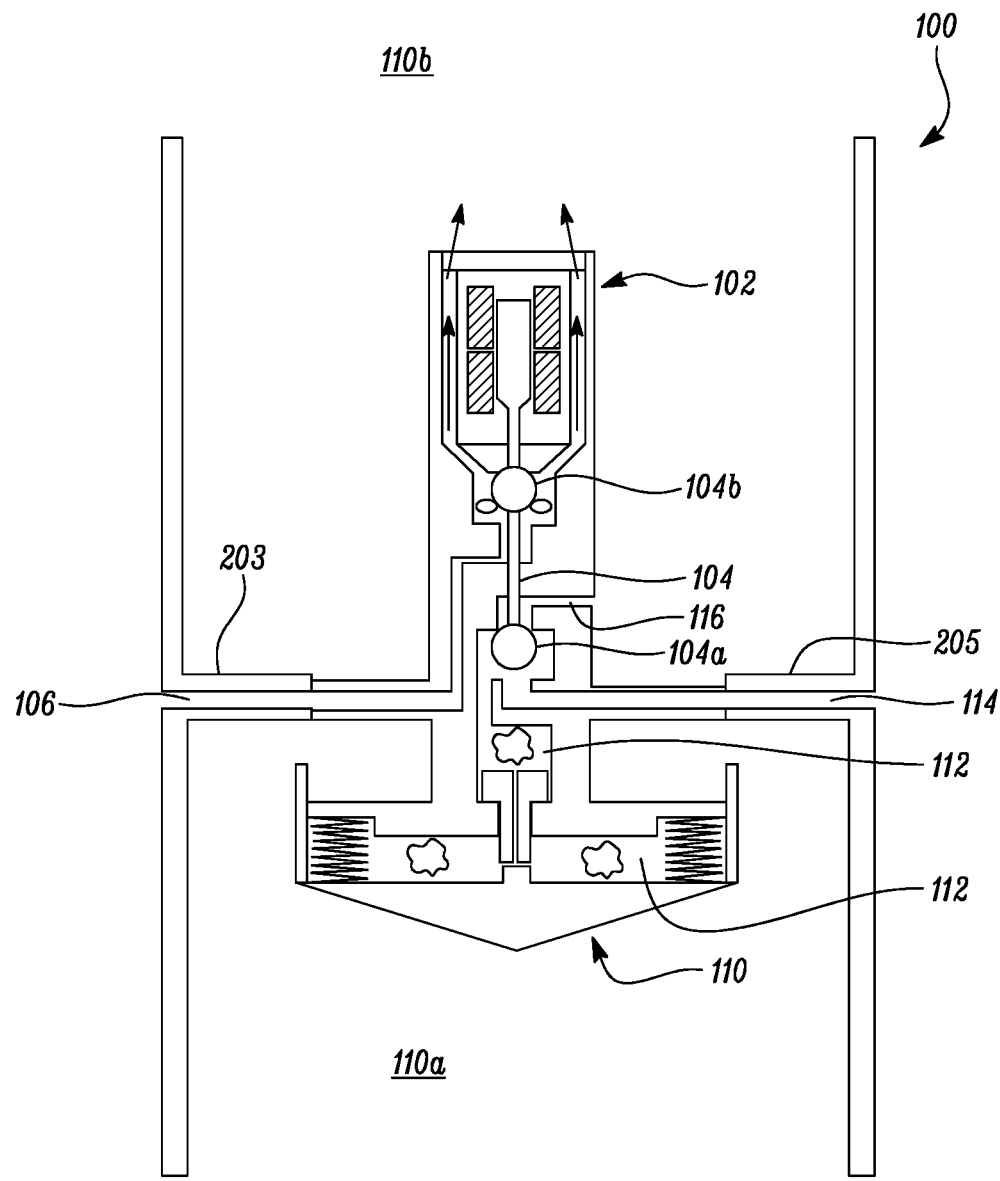
FIG. 3A is a schematic sectional view of a controller assembly in a first mode.

FIG. 3A shows a controller assembly 100. The controller assembly 100 comprises an electromechanical actuator 102 and a single-stage pneumatic flow switch 104. The single-stage pneumatic flow switch 104 is configured to thermally protect the electromechanical actuator by a supply of cooling fluid, as will be explained below.

The assembly 100 is coupled to a valve 110. The valve 110 is moveable between an open position and a closed position. In the open position, the valve 110 permits flow of a fluid through a fluid flow path (not shown in the Figures) through the valve 110. Accordingly, the valve 110 has an upstream section, or fluid flow inlet, 110a, and a downstream section, or fluid flow outlet 110b. The actuator 102 is disposed in the flow outlet 110b.

Although one type of valve is depicted in the figures it will be understood that this is exemplary only for better understanding of the figures, and that any type of valve may be used in conjunction with the controller assembly 100.

In the open position, the valve 110 is configured to allow fluid to flow from the upstream section 110a to the downstream section 110b through a flowbore (not shown) in the valve that fluidly connects the upstream and downstream sections.

Figure 3B:
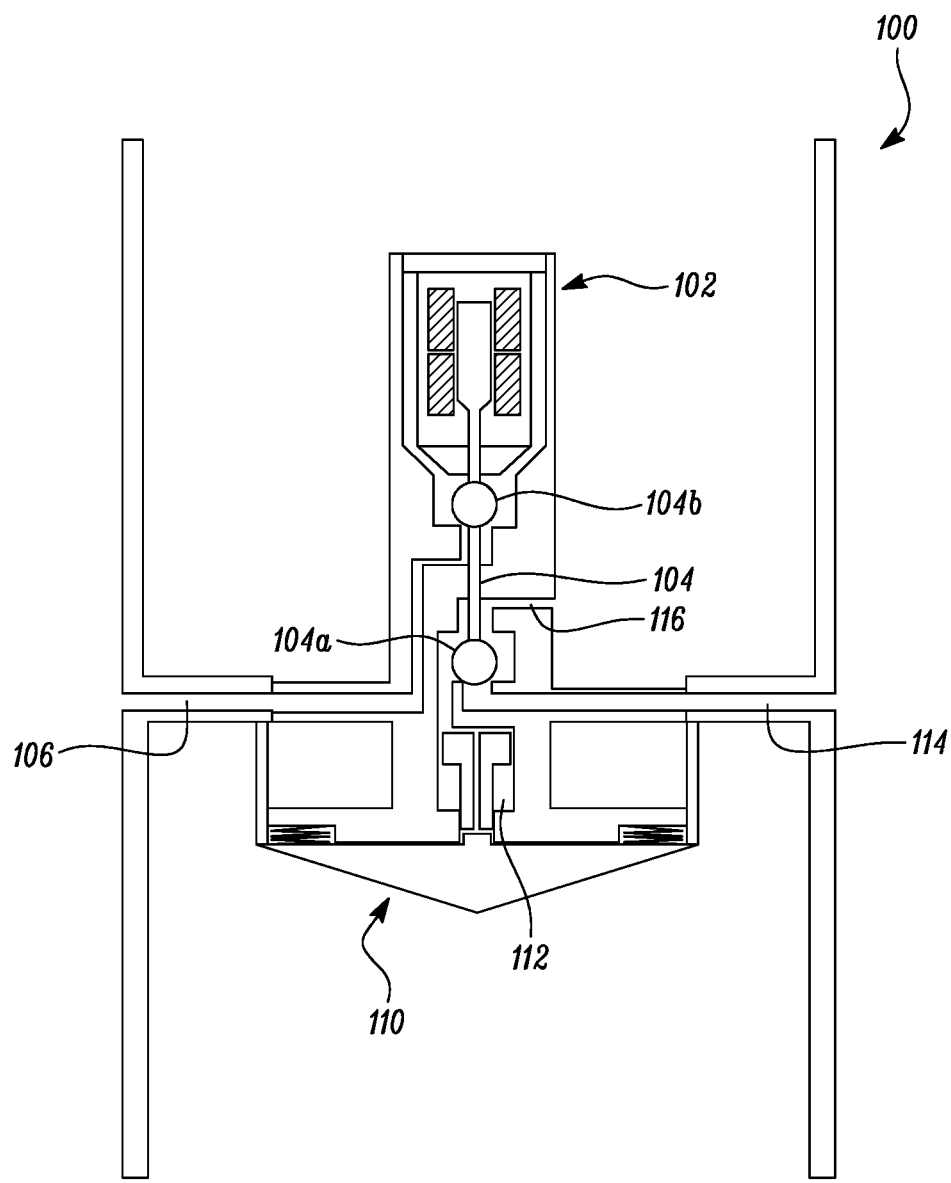
FIG. 3B is a schematic sectional view of a controller assembly in a second mode.

The switch 104 is moveable between a first mode (shown in FIG. 3A) and a second mode (shown in FIG. 3B). In the first mode the switch 104 is configured to open a cooling fluid flow passage 106. The cooling fluid flow passage 106 is fluidly connected to the actuator 102 and is for supplying a cooling fluid to the actuator 102. Therefore, in its first mode the switch 104 is configured to open the cooling fluid flow passage 106 to thereby supply cooling fluid to the actuator 102 to thermally protect the actuator 102. When the cooling fluid flow passage is open (as depicted in FIG. 3A) cooling fluid is routed toward an around the actuator 102 to insulate the actuator 102 in a thermal jacket.

The valve 110 comprises a valve control chamber 112. A control chamber flow passage 114 fluidly connects the valve control chamber 112 with a (not shown) pressure source. The control chamber flow passage 114 is therefore to supply pressure (e.g. pressurised fluid) to the control chamber 112. In this example, when pressure in the control chamber 112 reaches a predetermined level the valve 110 may move into its open position permitting fluid to flow through the valve 110. Therefore, pressure in the control chamber 112 may open and close the valve 110.

The switch 104 is configured to open and close the control chamber flow passage 114. The switch 104, in its first mode, is configured to open the control chamber flow passage 114 and, in its second mode, is configured to close the control chamber flow passage 114. Therefore, the switch 104 is configured to open and close the valve 110. More specifically, in its first mode the switch 104 is configured to open the valve 110 and in its second mode the switch 104 is configured to close the valve 110.

Hot air may flow through the valve 110, e.g. from the upstream 110a to the downstream 110b side, when the valve 110 is open. As the valve 110 may be opened by the switch 104 moving into its first mode (FIG. 3A) the control assembly 100 may simultaneously open the valve 110 and supply cooling fluid to the actuator 102. More specifically, as the switch 104 in its first mode opens both the control chamber flow passage 114 (which will cause the valve 110 to open) and the cooling fluid flow passage 106, as hot air flows through the valve and downstream to and around the actuator 102, concurrently a supply of cooling fluid is routed to the actuator 102 to thermally protect it from the hot air, allowing the actuator 102 to operate at higher temperatures since it is operating within a cooling jacket. When the switch 104 moves to its second mode this closes the control chamber flow passage 114 and the cooling fluid flow passage 114 and so the cooling fluid is supplied to the actuator 102 only when the valve is open.

In its first mode, the switch 104 blocks a vent passage 116, and connects fluid passage 114 to the control chamber 112. As will be explained later, the vent passage 116 is for routing fluid out from the control chamber 112. In its second mode the switch 104 is configured to open the vent passage 116. Therefore, in its first mode the switch 104 is for routing fluid from the control chamber fluid passage 114 to the valve control chamber 112 and for closing off the vent passage 116. Therefore, in its second mode the switch 104 is for routing fluid from the control chamber 112 to the vent passage 116 and for closing off fluid passage 114.

The switch 104 comprises a first (or primary) switch portion 104a, depicted in the example of FIG. 3 as a first valve member and a second (or secondary) switch portion 104b, depicted in the example of FIG. 3 as a second valve member. The primary switch 104a is moveable between a first position in which the primary switch 104a is seated against the vent passage 116 to block fluid through the vent passage 116 and remote from the control chamber flow passage 114 to permit fluid through the control chamber flow passage 114, and a second position in which the primary switch 104a is seated against the control chamber flow passage 114 to block fluid through the control chamber flow passage 114 and remote from the vent passage 116 to allow fluid flow through the vent passage 116. The first position of the primary switch 104a is depicted in FIG. 3A and the second position of the primary switch 104a is depicted in FIG. 3B. The secondary switch 104b is moveable between a first position in which it is remote from the cooling fluid flow passage 106 to permit flow of cooling fluid through the cooling fluid flow passage 106, and a second position in which it is seated against the cooling fluid flow passage 106 so as to block the cooling fluid flow passage. The first position of the secondary switch 104b is depicted in FIG. 3A and the second position of the secondary switch 104b is depicted in FIG. 3B.

Therefore, when the switch 104 is in its first mode, the primary and secondary switches 104a, 104b are in their first positions, and when the switch 104 is in its second mode the primary and secondary switches 104a, 104b are in their second positions.

The actuator 102 is depicted as a solenoid although in other examples it may be another type of actuator. The actuator 102 may comprise a solenoid (for example, a fuel, oil, pneumatic, or hydraulic solenoid). The actuator 102 is configured to cause the switch 104 to transition between its first and second modes (i.e. between the configurations shown in FIGS. 3A and 3B, respectively). Therefore, the actuator 102 is configure to move the switch 104 to its first mode to thereby open the control chamber flow passage 114 and close the vent passage 116, and to open the cooling fluid flow passage 106. The actuator 102 is configured to move the switch 104 to its second mode to thereby close the cooling fluid flow passage 106 and open the vent passage 116, and to close the cooling fluid flow passage 106. In this way, the actuator 102 is therefore configured to open and close the valve 110.

FIG. 3B shows the control assembly 100 when the switch 104 is in its second mode. In the second mode, the primary switch 104a is seated against the control chamber flow passage 114 to close the passage, and is remote from the vent passage 116 thereby opening the vent passage 116. In the second mode, the secondary switch 104b is seated against the cooling fluid flow passage 106 to close the cooling fluid flow passage 106. Thereby, in the second mode the control chamber 112 is fluidly connected with the vent passage 116. Accordingly, the switch 104 is configured to vent the control chamber 112 of the valve 110 to thereby close the valve 110.

It will be appreciated therefore that the actuator 102 is configured to open and close the valve 110 as the actuator 102 is configured to move the switch 104 between its first and second modes. This will open and close the valve 110 since the control chamber fluid flow passage 114 will be selectively opened and closed when the primary switch 104a moves between its first and second positions.

The control chamber flow passage 114 may be connected to a source of fluid at a higher pressure than the pressure across the valve 110 to supply pressure to the control chamber 112 of the valve to open the valve 110. Alternatively, or additionally, the control chamber flow passage 114 may be connected to a source of fluid from an upstream side of the valve.

It will also be appreciated that the primary switching portion 104a is a 2-state 3-way switch for controlling the pressurisation or venting of the control chamber of the valve 110 (which is a 2-state valve) in this example. It will also be appreciated that the secondary switch portion 104b is a 2-state 2-way switch for controlling the flow of cooling air. In this way the switch 104 comprises a tandem switch. In this way, both portions 104a and 104b are configured to move together, e.g. in tandem, so that the control chamber is pressurised to open the valve concurrently with the cooling flow passage being opened. In this way, for some examples, the control assembly 100 only provides cooling flow when the valve 110 is open. In other words, in these examples, the control assembly 100 only provides cooling flow when it is in the presence of high temperature efflux air from the valve 110. In this way, a specific fuel consumption penalty is only incurred when it is necessary to cool the controller, and wasteful parasitic cooling flows may therefore be therefore avoided.

The control assembly 100 may be for use with a gas turbine engine, for example the engine 10 of FIGS. 1 and 2. For example, the upstream side of the valve may receive fluid from a compressor 14, 15 or from a turbine 17, 19 of the engine 10.

Figure 4:
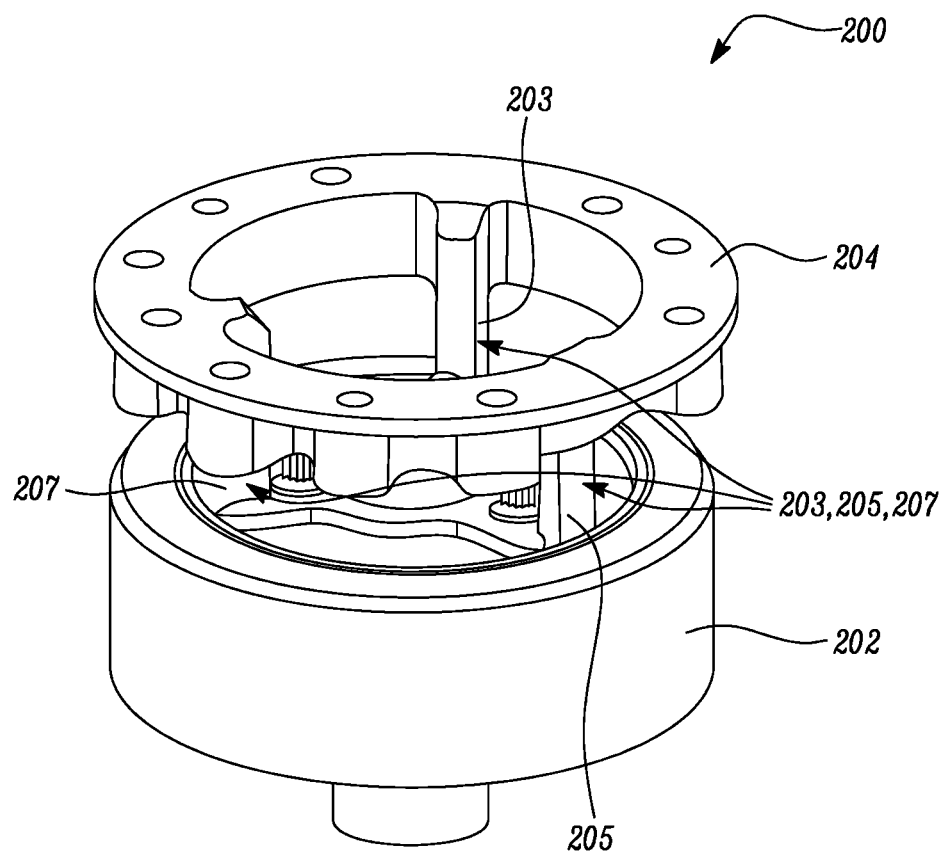
FIG. 4 is a schematic sectional view of part of a control assembly.

FIG. 4 shows an example valve assembly 200 which may comprise the control assembly 100 of FIGS. 3A and 3B. The valve assembly 200 comprises an upstream housing 202 and a downstream housing 204. One of the upstream and downstream housings 202, 204 may be moveable relative to the other one. Three spokes 203, 205 and 207 connect the two housings 202, 204. The housings 202, 204 may be part of a valve body. The electromechanical actuator 102 may be connected to, or comprised in, the second housing 204 and the valve 110 may be connected to, or comprised in, the first housing 202. In one example, the cooling fluid flow passage 106 is at least partially within one of the spokes 203, 205, 207. In one example, the control chamber flow passage 114 is at least partially within one of the spokes 203, 205, 207. In one example, the cooling fluid flow passage 106 is at least partially within one of the spokes 203, 205, 207 and the control chamber flow passage 114 is at least partially within another of the spokes 203, 205, 207.

In one example, a first spoke 203 may carry air to the control chamber 112 to effect the change of state of the valve 110 (e.g. to transition between open and closed states). In one example, a second spoke 205 may carry the cooling air to shield the control assembly from the hot air in a downstream portion 110b of the valve 110. In one example, a third spoke may carry at least one wire, e.g. an electrical wire, from the coils of the actuator (in examples where the actuator comprises a solenoid) to a corresponding electrical connector on the valve 110 so that the actuator is configured to control the valve.

In the example of FIG. 4 the three spokes are equally spaced, with approximately (or exactly) 120 degrees between the spokes. Although three spokes are depicted any number may be used.

Referring back to FIG. 3A, two spokes 203, 205 are shown (although any number of spokes may be used). In the example of FIG. 4 the spokes are axial spokes, but in the example of FIG. 3B they are radial spokes.

In the example of FIG. 3B the cooling passage 106 is at least partially contained in a first spoke 203 and the control chamber flow passage 114 is at least partially contained in a second spoke 205.

In a further example, the controller assembly may be located on the downstream face of the valve, e.g. outboard of the valve spokes. In which case it may not be necessary to carry the cooling flow or electrical wiring through any spokes. In such a configuration one spoke may carry the air into/out of the valve control chamber 112. As such, in one example there may only be one spoke.

The gas turbine engine 10 of the examples of FIGS. 1 and 2 may comprise the valve assembly 200.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A controller assembly comprising:
   an electromechanical actuator; and
   a single-stage pneumatic flow switch configured to thermally protect the electromechanical actuator by a supply of cooling fluid;
   wherein the single-stage pneumatic flow switch is movable between a first mode in which the switch is configured to open a cooling fluid flow passage and a second mode in which the switch is configured to close the cooling fluid flow passage;
   wherein the electromechanical actuator is coupled to a valve movable between an open configuration and a closed configuration; and
   wherein the electromechanical actuator is disposed in a fluid flow outlet of the valve.

2. The controller assembly of claim 1, wherein, when in the first mode, the single-stage pneumatic flow switch is configured to open a further fluid flow passage and, when in the second mode, the switch is configured to close the further fluid flow passage.

3. The controller assembly of claim 2, wherein the further fluid flow passage is connected to a control chamber of the valve.

4. The controller assembly of claim 3, wherein, when in the second mode the single-stage pneumatic flow switch is configured to open a vent flow passage so that the control chamber of the valve is in fluid communication with the vent flow passage.

5. The controller assembly of claim 3, wherein the further fluid flow passage is connected to a source of fluid at a higher pressure than the pressure across the valve to thereby pressurize the control chamber of the valve.

6. The controller assembly of claim 1, wherein, when in the first mode, the single-stage pneumatic flow switch is configured to cause the valve to open and, when in the second mode, the switch is configured to cause the valve to close.

7. The controller assembly of claim 1, wherein the electromechanical actuator is configured to cause the switch to transition between its first and second modes, thereby configured to cause the valve to transition between the open and closed configurations.

8. The controller assembly of claim 1, wherein the electromechanical actuator comprises a solenoid.

9. A controller assembly comprising:
an electromechanical actuator; and
a single-stage pneumatic flow switch configured to thermally protect the electromechanical actuator by a supply of cooling fluid;
wherein the single-stage pneumatic flow switch is movable between a first mode in which the switch is configured to open a cooling fluid flow passage and a second mode in which the switch is configured to close the cooling fluid flow passage;
wherein the electromechanical actuator is coupled to a valve movable between an open configuration and a closed configuration;
wherein, when in the first mode, the single-stage pneumatic flow switch is configured to open a further fluid flow passage and, when in the second mode, the switch is configured to close the further fluid flow passage;
wherein the further fluid flow passage is connected to a control chamber of the valve;
wherein the further fluid flow passage is connected to a source of fluid at a higher pressure than the pressure across the valve to thereby pressurize the control chamber of the valve; and
wherein the further fluid flow passage is connected to a source of fluid from an upstream side of the valve.

10. A gas turbine engine for an aircraft, the gas turbine engine comprising:
an engine core comprising a turbine, a compressor, and a core shaft connecting the turbine to the compressor;
a fan located upstream of the engine core, the fan comprising a plurality of fan blades;
a controller assembly comprising:
an electromechanical actuator; and
a single-stage pneumatic flow switch configured to thermally protect the electromechanical actuator by a supply of cooling fluid;
wherein the single-stage pneumatic flow switch is movable between a first mode in which the switch is configured to open a cooling fluid flow passage and a second mode in which the switch is configured to close the cooling fluid flow passage; and
wherein the electromechanical actuator is coupled to a valve movable between an open configuration and a closed configuration.

11. The gas turbine engine of claim 10, wherein the controller assembly is disposed within a valve body, and wherein at least one spoke connects the valve body to the electromechanical actuator; wherein the cooling fluid flow passage is at least partially located within one spoke.

12. The gas turbine engine of claim 11, wherein the valve body comprises the valve having a control chamber, wherein at least one spoke connects the valve body to the electromechanical actuator and wherein a pressure source is connected to the valve control chamber, the pressure source being at least partially located within one spoke.

* * * * *